(12) United States Patent
Fiero et al.

(10) Patent No.: US 11,390,057 B2
(45) Date of Patent: Jul. 19, 2022

(54) LOW AND ULTRA LOW DENSITY BUTYL CONSTRAINED LAYER PATCHES

(71) Applicant: ADCO PRODUCTS, LLC, Michigan Center, MI (US)

(72) Inventors: Paul Fiero, Jackson, MI (US); Richard Foukes, Shelby Township, MI (US)

(73) Assignee: ADCO PRODUCTS, LLC, Michigan Center, MI (US)

( * ) Notice: Subject to any disclaimer, the term of this patent is extended or adjusted under 35 U.S.C. 154(b) by 828 days.

(21) Appl. No.: 16/307,785

(22) PCT Filed: Jun. 9, 2017

(86) PCT No.: PCT/US2017/036809
§ 371 (c)(1),
(2) Date: Dec. 6, 2018

(87) PCT Pub. No.: WO2017/214544
PCT Pub. Date: Dec. 14, 2017

(65) Prior Publication Data
US 2019/0299571 A1    Oct. 3, 2019

Related U.S. Application Data

(60) Provisional application No. 62/348,473, filed on Jun. 10, 2016.

(51) Int. Cl.
*B32B 15/06* (2006.01)
*B32B 25/18* (2006.01)
(Continued)

(52) U.S. Cl.
CPC .............. *B32B 25/18* (2013.01); *B32B 15/06* (2013.01); *B32B 15/18* (2013.01); *B32B 15/20* (2013.01);
(Continued)

(58) Field of Classification Search
CPC ... B32B 15/06; B32B 15/08; B32B 25/00–20; E04F 15/20–206;
(Continued)

(56) References Cited

U.S. PATENT DOCUMENTS 4,707,397 A * 11/1987 Morimura ............... B32B 15/06
                                                                428/416
4,942,219 A *  7/1990 Yatsuka ................... C08L 67/04
                                                                428/458
(Continued)

FOREIGN PATENT DOCUMENTS

JP        09-230873 A     9/1997
JP        2000-301640 A   10/2000

OTHER PUBLICATIONS

NPL on HV300 from Nippon Oil.*
International Search Report and Written Opinion issued in PCT/US2017/036809, dated Aug. 29, 2017, 13pgs.

*Primary Examiner* — Z. Jim Yang
(74) *Attorney, Agent, or Firm* — Daniel J. Barta; Kirsten Stone

(57) ABSTRACT

The present disclosure relates to use of a sound and vibration damping system for use in automotive, appliance and other applications. Specifically, the sound and vibration damping system includes an elastomeric layer prepared from a low density butyl based composition and a constraining layer. The low density butyl based composition comprises at least one polybutene, at least one butyl rubber and light weight fillers. The sound and vibration damping system of the present disclosure has a specific gravity less than 1.0 and a loss factor of not more than 0.4 at 20° F., 40° F. and 70° F. for frequencies of 200 Hz, 400 Hz and 800 Hz.

15 Claims, 4 Drawing Sheets

(51) Int. Cl.
  *B32B 15/20* (2006.01)
  *B32B 17/06* (2006.01)
  *B32B 21/04* (2006.01)
  *B32B 25/08* (2006.01)
  *G10K 11/168* (2006.01)
  *B32B 25/14* (2006.01)
  *B32B 25/02* (2006.01)
  *B32B 25/04* (2006.01)
  *B32B 15/18* (2006.01)

(52) U.S. Cl.
  CPC .......... *B32B 17/063* (2013.01); *B32B 21/045* (2013.01); *B32B 25/02* (2013.01); *B32B 25/04* (2013.01); *B32B 25/08* (2013.01); *B32B 25/14* (2013.01); *G10K 11/168* (2013.01); *B32B 2250/03* (2013.01); *B32B 2262/062* (2013.01); *B32B 2264/10* (2013.01); *B32B 2264/101* (2013.01); *B32B 2264/102* (2013.01); *B32B 2270/00* (2013.01); *B32B 2307/10* (2013.01); *B32B 2307/102* (2013.01); *B32B 2307/72* (2013.01); *B32B 2605/00* (2013.01)

(58) Field of Classification Search
  CPC ... E04F 2290/041–043; E04B 1/84–86; B60R 13/0815; B60R 13/0823; B60R 13/083; B60R 13/0884; C08L 23/18; C08L 23/20; C08L 23/22; C08L 21/00; G10K 11/162–172
  See application file for complete search history.

(56) References Cited

U.S. PATENT DOCUMENTS

| | | | | |
|---|---|---|---|---|
| 5,063,098 A * | 11/1991 | Niwa | ...................... | B32B 27/08 428/76 |
| 5,081,179 A * | 1/1992 | Sezaki | ...................... | C08L 53/00 525/194 |
| 5,213,879 A * | 5/1993 | Niwa | ................... | G10K 11/168 428/492 |
| 5,438,090 A * | 8/1995 | Matsubara | ............... | C08J 3/005 525/240 |
| 5,840,797 A * | 11/1998 | Singh | ...................... | B32B 25/18 524/495 |
| 2002/0015840 A1* | 2/2002 | Kakimoto | ............... | B32B 25/12 428/327 |
| 2004/0214008 A1* | 10/2004 | Dobrusky | ............. | B60R 13/083 428/480 |
| 2004/0219322 A1* | 11/2004 | Fisher | ..................... | B60R 13/08 428/40.1 |
| 2005/0019590 A1* | 1/2005 | Josefsson | ............. | G10K 11/168 428/457 |
| 2006/0013996 A1* | 1/2006 | Koyama | .................... | B32B 5/08 442/381 |
| 2006/0040096 A1* | 2/2006 | Eadara | .................... | B32B 25/18 428/212 |
| 2006/0104817 A1* | 5/2006 | Bonnet | .................. | B32B 15/08 416/229 R |
| 2009/0148712 A1* | 6/2009 | Xiao | ..................... | G10K 11/162 156/60 |
| 2009/0233069 A1* | 9/2009 | Merlette | ............. | B60R 13/0861 156/60 |
| 2010/0013255 A1* | 1/2010 | Mantovani | ........... | G10K 11/168 296/1.03 |
| 2010/0256302 A1* | 10/2010 | Matsumoto | ................ | C08L 9/02 156/60 |
| 2012/0169083 A1* | 7/2012 | Matsumoto | ................ | B60J 5/04 296/146.7 |
| 2013/0043091 A1* | 2/2013 | Wheeler | ..................... | C09J 7/22 181/294 |
| 2014/0339037 A1* | 11/2014 | Kawaguchi | ............. | C08L 21/00 188/380 |
| 2016/0035339 A1 | 2/2016 | Liang et al. | | |
| 2016/0377139 A1* | 12/2016 | Vito | ........................ | B32B 25/18 267/141 |
| 2016/0379615 A1* | 12/2016 | Bao | .......................... | C08K 3/04 252/62 |
| 2017/0198127 A1* | 7/2017 | Park | .......................... | C08L 21/00 |
| 2018/0156296 A1* | 6/2018 | Alexander | ................ | B32B 3/30 |
| 2018/0319961 A1* | 11/2018 | Jourdain | ................. | C08J 3/005 |
| 2021/0277285 A1* | 9/2021 | Milliman | ................... | C09J 7/28 |

* cited by examiner

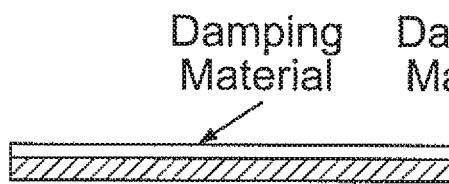
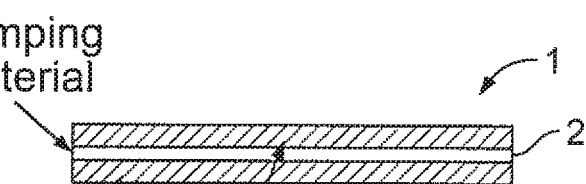
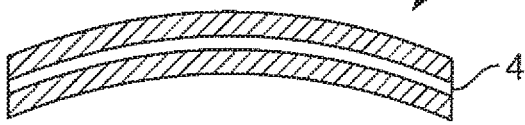
FIG. 1A  FIG. 1B

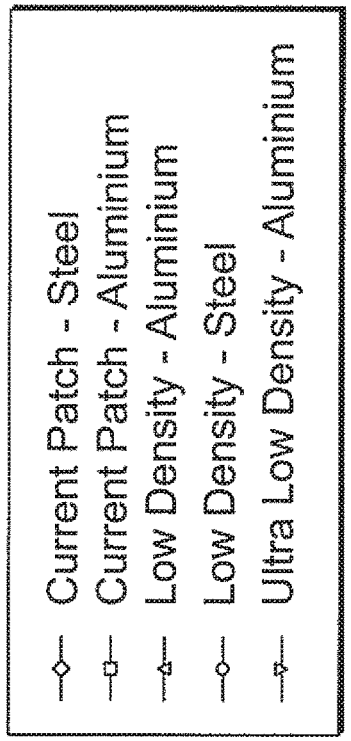
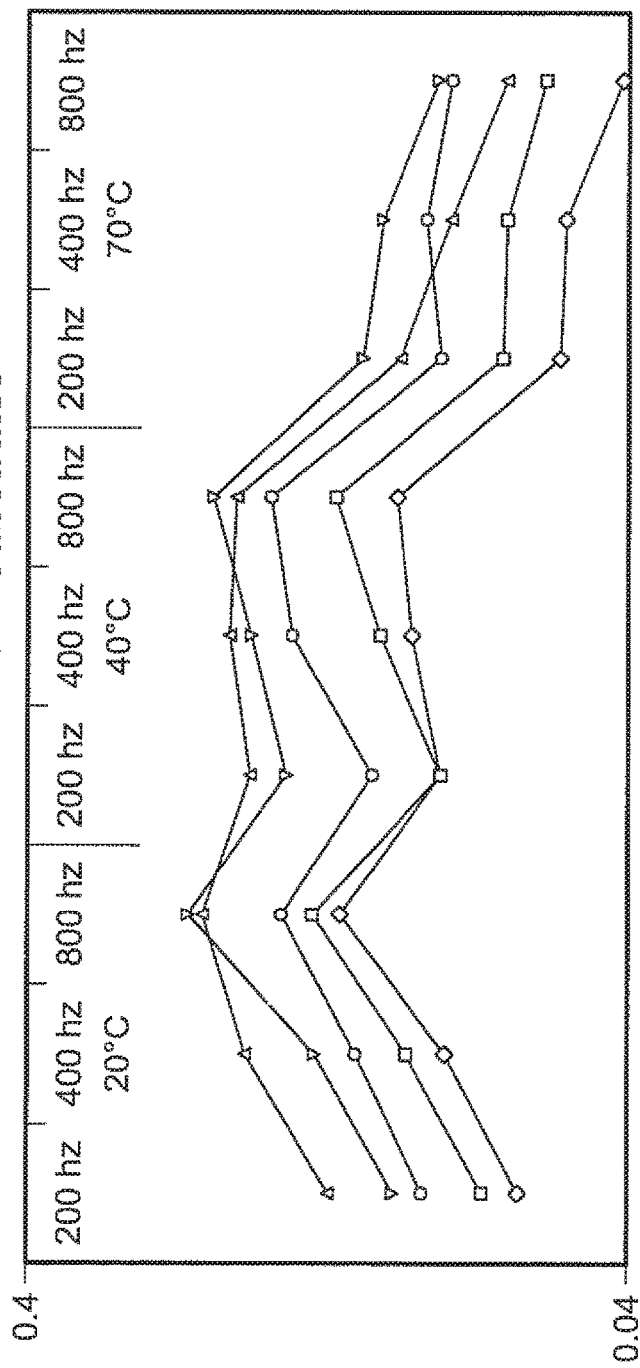
FIG. 3A

LOW AND ULTRA LOW DENSITY BUTYL CONSTRAINED LAYER PATCHES

RELATED APPLICATION DATA

This application claims the benefit of U.S. Provisional Application No. 62/348,473 filed on Jun. 10, 2016. The contents of the above application are incorporated herein by reference in its entirety.

FIELD OF INVENTION

The present disclosure relates to use of a sound and vibration damping system for use in automotive, appliance and other applications. Specifically, the sound and vibration damping system includes an elastomeric layer prepared from a low density butyl based composition, and a constraining layer.

BACKGROUND

A sound and vibration damping system is widely used in the transportation, building, aerospace and appliance industries to reduce the vibration and sounds of the mechanical systems. The sound damping system is typically applied to selected parts or areas of the automobile or aircraft such as the door, floor, roof, etc. to prevent the vibrations and noise from being transmitted inside the automobile or outside the appliance.

A typical damping system may include a thermoplastic or rubber layer or patch and a constraining layer that together are effective in suppressing the extraneous vibrations and sounds. These damping systems primarily depend on the density and mass of the thermoplastic layer for effective sound damping function. While a denser and heavier thermoplastic layer offers better sound damping effects such damping systems often contribute to the increased weight of the vehicle or appliance. Any attempts to reduce the overall weight of the vehicle or appliance has to occur only at the expense of the mass of the thermoplastic layer. Hence there is a need in the art for a light weight, sound and vibration damping system that is independent on mass or density, for use in the automotive and appliance industries.

SUMMARY OF THE INVENTION

The present application includes a high performance, low weight sound and vibration damping system comprised of (i) an elastomeric layer and (ii) a constraining layer.

The sound and vibration damping system may be disposed over a substrate or a base layer. The substrate layer and the constraining layer may be formed of the same material, such as but not limited to aluminum foil or may be formed of different materials.

The elastomeric layer of the disclosed sound and vibration damping system is prepared from a low density butyl based composition comprising: at least one or more types of synthetic rubber such as but not limited to styrene-butadiene rubber (SBR), ethylene propylene diene monomer rubber or (EPDM), ethylene propylene rubber (EPR), polybutene, etc., at least one or more grades of polybutene and light weight fillers having a specific gravity of less than 0.5 g/cm$^3$ such as but not limited to cellulose fibers and one or more grades of glass beads. More specifically, the elastomeric layer is prepared from a low density, butyl based uncured composition that includes about 100 parts of one or more types of synthetic rubber blended with 261 parts of one or more grades of polybutene, and about 186 parts of light-weight fillers. The specific gravity of the uncured low density butyl based composition may be less than 1.

The low density butyl based composition that form the elastomeric layer of the disclosed sound and vibration damping system may optionally include other ingredients to further customize the specific properties needed or desired. These optional ingredients may include various tackifiers, molecular weight broadening agents, anti-oxidants, convention rheology modifying fillers, pigments, dispersion or processing aides, and mixtures thereof.

The elastomeric layer of the present disclosure when applied with a constraining layer, provides a superior and importantly, a light weight sound and vibration-damping system. The damping properties are generally measured by loss factors and the sound and vibration damping system of the present disclosure exhibits a loss factor of not less than 0.03 and not more than 0.4 for frequencies of 200 Hz, 400 Hz and 800 Hz for both lighter samples (about 1.0 specific gravity) and heavier samples (about 1.6 specific gravity).

BRIEF DESCRIPTION OF DRAWINGS

FIG. 1 is a perspective view of the sound and vibration damping system shown without a constraining layer (A) and with a constraining layer (B).

FIG. 3a is a graph of the sound loss data for samples over steel and aluminum substrates and FIG. 3b is a graph showing the performance difference between the disclosed sound and vibration system (with the constrained layer) and a control system (without the constrained layer) at 20° F., 40° F. and 70° F. for frequencies of 200 Hz, 400 Hz and 800 Hz.

DETAILED DESCRIPTION

Figure 2:
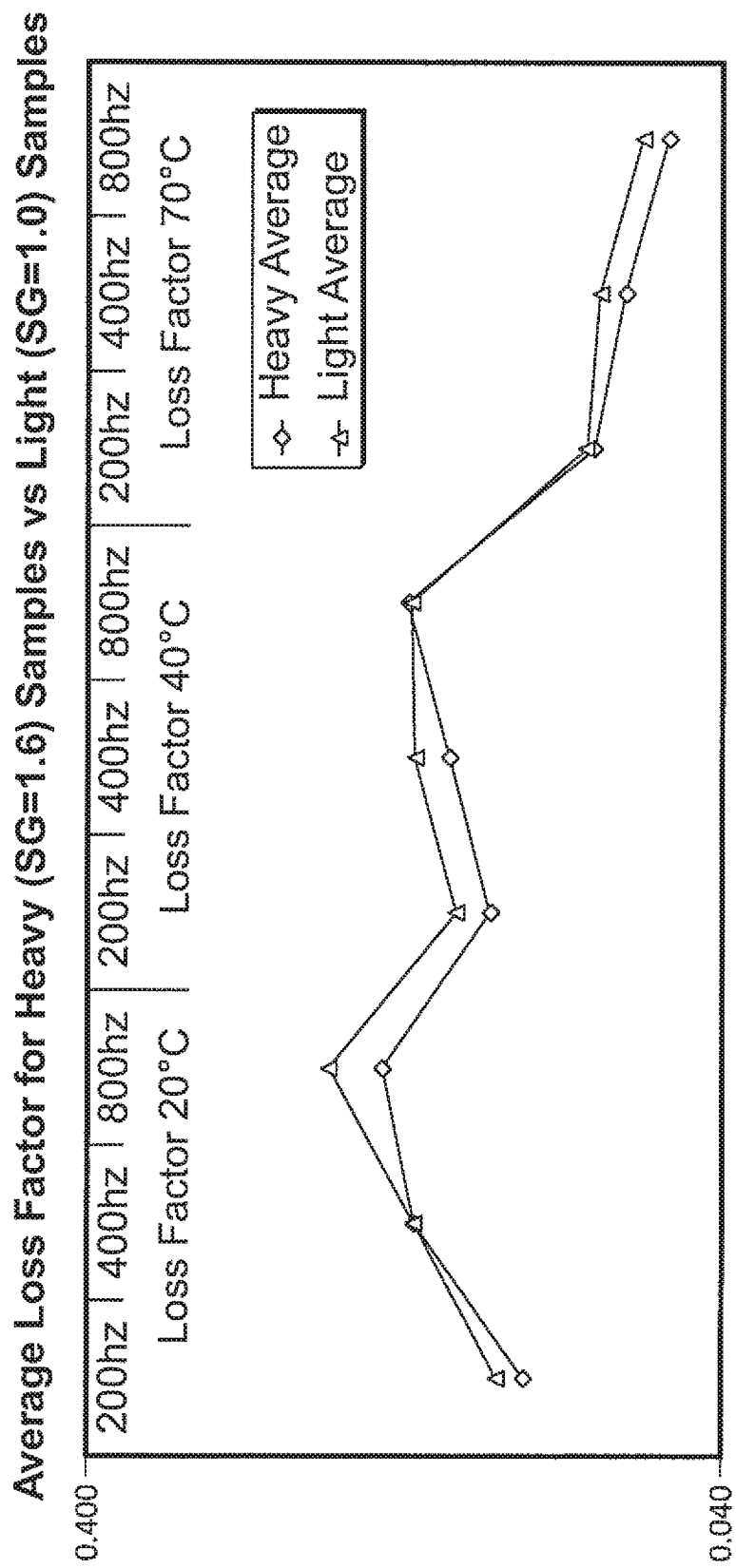
FIG. 2 is a graph showing the loss factor for heavy versus light samples measured at 20° F., 40° F. and 70° F. for frequencies of 200 Hz, 400 Hz and 800 Hz.

In this disclosure a sound and vibration damping system comprising an elastomeric layer and a constraining layer has been found to exhibit damping principles independent of mass and provides desirable sound and vibration damping properties. The sound and vibration damping system may be applied over a substrate or base layer, the base layer including but not limited to sheet metal, steel, aluminum, glass, wood, etc. The constraining layer is typically formed of materials including but not limited to aluminum foil, lightweight damping foam, etc.

The elastomeric layer of the sound and vibration damping system may be prepared from a low density butyl based composition that includes at least one synthetic rubber polymer, at least one or more grades of polybutene, and a plurality of light weight fillers selected from the group of glass beads (also referred to as glass bubbles or microspheres) or cellulose fibers or mixtures thereof. The low density butyl based composition may be uncured and have a specific gravity of less than 1.0. The resulting sound and vibration damping system may have a loss factor of greater than 0.06 and less than 0.4.

In one embodiment, the synthetic rubber polymer may include butyl rubber, or styrene-butadiene rubber (SBR) or ethylene propylene diene monomer rubber or (EPDM), ethylene propylene rubber (EPR) or polyisobutylene, or mixtures thereof. It has been found that the synthetic rubber polymer component may provide the required structure and flexibility to the sound and vibration damping system.

Suitable commercial butyl rubbers include Butyl 065, 077, 165, 268 or 365, Exxpro 96-1, available from ExxonMobil Chemical. The synthetic rubber polymer may also include halogenated butyl rubber such as Bromobutyl 2030 or X-2, or Chlorobutyl 1240 or 1255, commercially available from Bayer; or Bromobutyl 2222, 2244, or 2255, or Chlorobutyl HT-1065, HT-1066, or HT-1068, commercially available from ExxonMobil Chemical. In one embodiment, the butyl rubber in the composition is BK-1675 Prime, available from Nizhnekamskneftekhim. The synthetic rubber polymer may be present in amounts of about 100 parts by weight of the total composition.

The polybutene may be a high molecular weight polyisobutylene, such as Vistanex L-80, L-100, L-120, or L-140, commercially available from ExxonMobil Chemical, or Oppanol B-50, B-80 or B-100, commercially available from BASF Corporation. The polybutylene may also include a low molecular weight polyisobutylene, such as Vistanex CP-24, LM-MS, LM-MH, LM-H or LM-S, commercially available from ExxonMobil Chemical, or Oppanol B-10, B-12, B-15 or B-30, commercially available from BASF Corporation, or P-10, P-12, or P-15, commercially available from Alcan Rubber and Chemical, or 4.OH, 4.5H, 5.OH, 5.5H, or 6HT, all commercially available from Rit-Chem. Other suitable polybutene include low or medium molecular weight polybutene and may include Indopol H-100, H-300, H-1500 or H-1900, all commercially available from Amoco Chemical or Soltex PB-32 or TPC Group; and Parapol 700, 950, 1300, 2200 or 2500, all commercially available from ExxonMobil Chemical. The polybutene in the low density butyl based composition acts as a plasticizer. The plasticizer imparts softness and high initial adhesivity to the composition. The one or more grades of polybutene may be present in amounts of about 261 parts by weight of the total composition.

The low density butyl based composition used to form the elastomeric layer of the disclosed sound and vibration damping system may also include 'light-weight fillers' such as high crush strength polymer additive glass beads or hollow glass microspheres or glass bubbles or cellulose fibers to drastically reduce the overall density of the sound and vibration damping system. Ideally, the light weight fillers have a specific gravity of less than 0.5 g/cm$^3$. Suitable glass beads, also referred to as glass bubbles or glass microspheres, are those that may withstand the blending process without breaking. The glass bubbles may be colorless or off-white in color and may be shaped as hollow spheres with thin walls. The glass bubbles may be made of soda-lime-borosilicate glass and may have an average diameter of about 20 microns. The bubbles may exhibit a crush strength of at least 16,000 psi and may have ideally have a density of about 0.46 g/cc. In one embodiment the glass bubbles in the composition are iM16K available from 3M™ and are present in amounts of about 186 parts by weight of the composition.

The low density butyl based composition used to form the elastomeric layer of the disclosed sound and vibration damping system may optionally include one or more thermoplastic polymer components, plasticizers, tackifier, fillers, coloring agents, reinforcing agents, antioxidants, or combinations thereof.

In one embodiment, the thermoplastic polymer component may include an amorphous polyolefin or an ethylene based copolymer or terpolymer. Suitable amorphous polyolefins include amorphous polypropylene-ethylene copolymers including E1003, E1060 or E1200; amorphous polypropylene/polypropylene-ethylene copolymers including M1010, M1018, M1020, M1025, or M1030; or amorphous polypropylene homopolymers including P1010 or P1023, all commercially available from Eastman Chemical; or Polytac R-500, commercially available from Crowley Chemical. Also suitable are amorphous polyethylene homopolymers including Epolene C-10, C-13, C-14, C-15, C-17, N-10, N-11, N-14, N-15, N-20, N-21 and N-34, all commercially available from Eastman Chemical; AC-6, AC-7, AC-8, AC-9, AC-617, AC-712, AC-715, AC-725, AC-735, or AC-1702, commercially available from Honeywell.

In another embodiment, suitable ethylene-based copolymers include ethylene/vinyl acetate copolymers including Elvax 40-W, 140-W, 150-W, 205-W, 210-W, 220-W, 240-W, 250-W, 260, 265, 310, 350, 360, 410, 420, 450, 460, 470, 550, 560, 650, 660, 670, 750, 760, or 770, all commercially available from DuPont; and AC-400, AC-400A, AC-405, or AC-430, all commercially available from Honeywell. Also suitable are ethylene-acrylic acid copolymers including AC-540, AC-540A, AC-580, and AC-5120, all commercially available from Honeywell. Suitable ethylene-based terpolymers include ethylene/vinyl acetate terpolymers including Elvax 4260, 4310, 4320, or 4355, commercially available from Honeywell.

The low density butyl based composition may also include an inexpensive polymer, such as but not limited to amorphous polyalphaolefin (APAO) waxes, reclaimed rubbers, styrene-butadiene rubber (SBR), or Asphalt to broaden the molecular weight range and can be present in the low density butyl based composition in amounts of about 33 parts by weight of the total composition. In one embodiment, the polymer is a Type-3 Oxidized Asphalt commercially available from the IKO group.

The low density butyl based composition may also include conventional inorganic or rheology modifying fillers including, but not limited to, barium sulfate, calcium carbonate, diatomaceous earth, magnesium silicate, mica, hydrous aluminum silicate, cellulose fiber, and mixtures thereof. The low density butyl based composition may optionally include a filler dispersing agent such as but not limited to Doumeen® TDO commercially available from AkzoNobel. The low density butyl based composition may also include a reinforcing agent including but not limited to silica. Suitable silica include hydrophilic fumed silicas such as Aerosil 90, 130, 150, 200, 300, or 380, commercially available from Degussa; Cab-O-Sil H-5, HS-5, L-90, LM-130, LM-150, M-5, PTG, MS-55, or EH-5, commercially available from Cabot; hydrophobic fumed silicas, such as Aerosil R202, R805, R812, R812S, R972, R974, or US202, commercially available from Degussa; Cab-O-Sil TS-530, TS-610, or TS-720, commercially available from Cabot; hydrated amorphous precipitated silica, for example, Hi-Sil 132, 135, 210, 233, 243LD, 255, 532EP, 752, 900, 915, or 2000, commercially available from PPG Industries; Hubersil 162, 162LR, 1613, 1633, 1714, 1743, or 4151 H, commercially available from J. M. Huber; or Garamite 1958, commercially available from Southern Clay Products. Mixtures of the above products may also be used. The amount of inorganic or reinforcing filler(s) in the low density butyl based composition may be present in about 153 parts by weight of the total composition.

Tackifying resins may also be used in the butyl based composition to increase the tackiness and to provide better adhesion of the sound and vibration damping system to a wide range of substrates or base layers. The tackifying resin may be terpenes, hydrogenated polycyclic resins, rosin esters, or aliphatic and/or aromatic hydrocarbon resins. The tackifying resin in the low density butyl based composition may be present in an amount of about 46 parts by weight of the total composition. Suitable hydrogenated polylicyclic resins include P-95, P-115, P-125 or P-140, commercially available from Arakawa Chemical; Escorez 5380, 5300, 5320 or 5340, commercially available from ExxonMobil Chemical; Regalite R91, R101, R125, or S260 and Regalrez 1018, 1085, 1094, 1126, 1128, 1139, 3102, 5095, or 4108, commercially available from Hercules; Eastotac H-100W, H-115W or H-130W, commercially available from Eastman Chemical; Hikorez A-1100, Sukorez SU-100, SU-110, SU-120 or SU-130, commercially available from Kolon Chemical.

Suitable aliphatic hydrocarbon resins include Escorez 1102, 1304, 1310LC, 1315, or 1504, commercially available from ExxonMobil Chemical; Nevtac 10, 80, 100, or 115, commercially available from Neville Chemical; Wingtack 10, 95 or Plus, commercially available from Goodyear Tire & Rubber; Eastotac H-100E, H-100R, H-100L, H-115E, H-115R, H-115L, H-130E, H-130R, or H-130L, commercially available from Eastman Chemical; Adtac LV, Piccopale 100, Piccotac B, Piccotac 95, or Piccotac 115, commercially available from Hercules; Hikorez A-1100, A-1100S, C-1100, R-1100, R-1100S, or T1080, commercially available from Kolon Chemical; ADHM-100, commercially available from Polysat Suitable aromatic hydrocarbon resins include Nevchem 70, 100, 110, 120, 130, 140, or 150, commercially available from Neville Chemical; Escorez 7105 or 7312, commercially available from ExxonMobil Chemical; Hikotack P-90, P-90S, P-110S, P-120, P-120S, P-120HS, P-140, P-140M, P-150, or P-160, commercially available from Kolon Chemical; Picco 1104, 2100, 5120, 5130, 5140, 6085, 6100, 6115, or 9140, Piccodiene 2215 or Piccovar AP10, AP25 or L60, commercially available from Hercules.

Other suitable tackifying resins include coumarone indene resins, for example, Cumar P-10, P-25, R-1, R-3, R-5, R-6, R-7, R-9, R-10, R-11, R-12, R-13, R-14, R-15, R-16, R-17, R-19, R-21, R-27, R-28, R-29, or LX-509, commercially available from Neville Chemical; or Natrorez 10 or 25, commercially available from Natrochem. Another suitable tackifying resin is an ester of hydrogenated rosin, for example, Foral 85 or 105 or Pentalyn A or H or Hercolyn D or Stabelite Ester 10 or Albalyn, commercially available from Hercules; or Komotac KF-462S, commercially available from Komo Chemical. Mixtures of the above resins may also be used.

Coloring agents may also be included in the composition. The coloring agents may include titanium dioxide, carbon black and coal filler.

In one embodiment, the low density butyl based composition may also include an antioxidant compound. Suitable antioxidants include, but are not limited to Wingstay C, K, L, S, or T, commercially available from Goodyear, and Irganox 245, 259, 565, 1010, 1035, 1076, 1098, 1330, 1425, 1520, or 3144 that are commercially available from Ciba Specialty Chemicals.

In general, the elastomeric patch of the present disclosure may be prepared by blending the synthetic rubbers and polybutene together with the fillers until the consistency is correct. A batch may have the right consistency when there are no lumps and is visually smooth and homogenous or the consistency may be measured by ASTM D217. In one embodiment, the target consistency of the low density composition may range from about 50 dmm (5 mm) to about 130 dmm (13 mm). The light weight fillers such as glass beads may be added last to the present low density composition so that they have as little exposure as possible to the blending conditions that could break the glass.

The resulting low density butyl based composition may be extruded onto a coated release liner or compacted between plates to obtain the low density butyl based elastomeric layer 2 as shown in FIGS. 1A and B. The constraining layer 3 may then be applied over the inherently sticky surface of the extruded or compacted elastomeric layer 2 to result in the final sound and vibration damping system 1 or product. In one embodiment, the damping system 1 may be placed over a substrate 4 such as the interior surface of a vehicle door thus forming a 'sandwich' construction, as shown in FIG. 1B. When the system flexes during vibration, shear strains develop over a whole area in the damping layer, as seen in FIG. 1B.

The vibration damping properties of a material is generally measured using the Engineering Society for Advancing Mobility Land Sea Air and Space, SAE J1637 test, which measures the vibration damping performance of a system consisting of a damping material bonded to a vibrating cantilevered steel bar generally known as the Oberst Bar. The test indicates the loss factors at the temperatures the material is subjected to. This test procedure is based on the method described in ASTM E 756 and differs only in that the SAE practice specifies the bar material, the bar size and the mounting conditions of the test sample. The loss factor q is a suitable index introduced as a measure of intrinsic damping of viscoelastic materials.

The loss factor of prior damping systems generally range at levels of about 0.09 to about 0.60 at temperature range of 20° F. to 60° F. or at levels of about 0.05 to about 0.7 at temperature ranges of 20° F. to 60° F. The loss factors of the present sound and vibration damping system on the other hand can range from not less than about 0.03 to not more than about 0.4 for a heavy sample (0.04 inch thickness) with a specific gravity of about 1.6 to a light sample (0.02 inch thickness) having a specific gravity of about 1.0 at 20° F., 40° F. and 70° F. for frequencies of 200 Hz, 400 Hz and 800 Hz (shown in Table 3 and FIGS. 2, 3A, and 3B). While a variety of factors such as increased number of phase interaction, firmness of the matrix, layer thickness, etc. can contribute to the loss factor performance of a patch, they can be optimized for specific performance requirements.

Importantly, it is traditionally thought that damping increases with damping layer thickness or substrate thickness. The latter is especially undesirable because it can potentially contribute to the increased or overall weight of the vehicle or appliance. Thus changing the composition of a damping material may also alter its effectiveness.

Figure 3B:
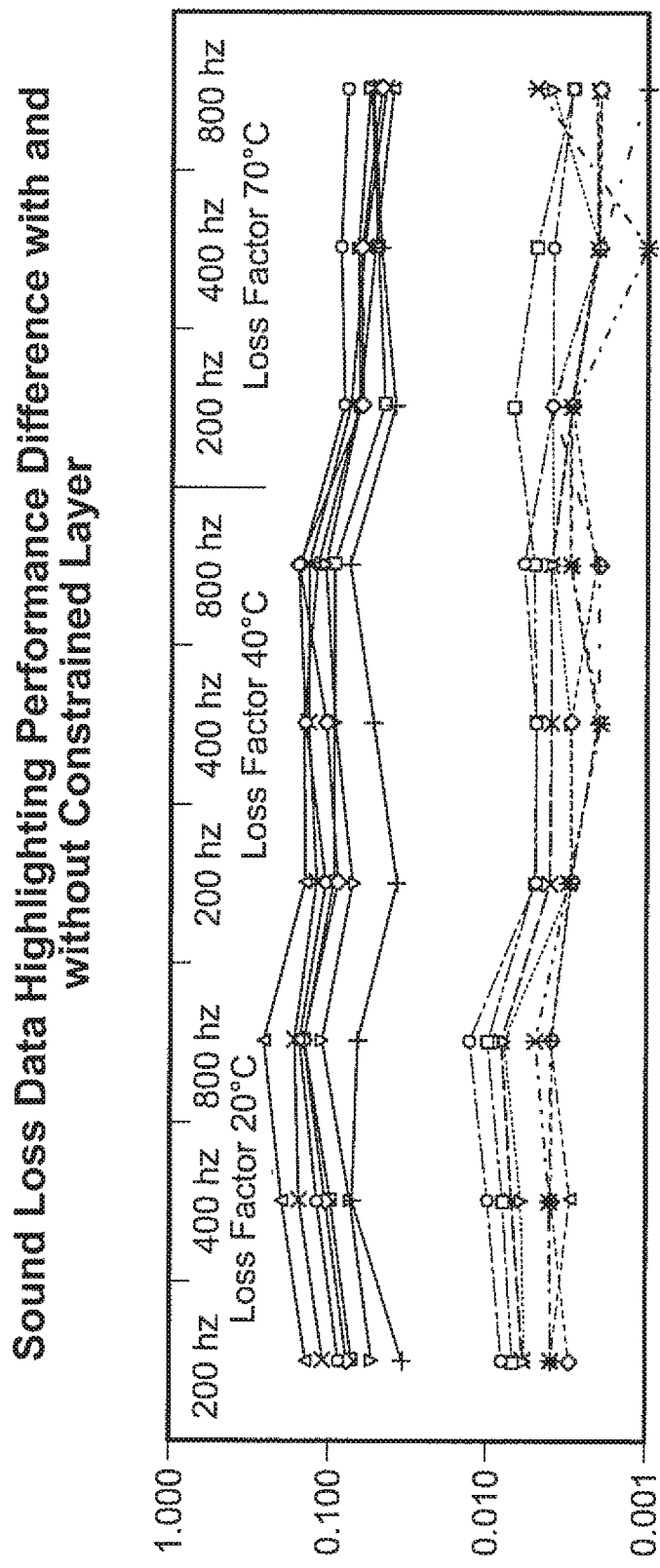

However, it was surprisingly found that the damping system disclosed herein achieves a damping effect or loss factor ranging from about 0.03 to about 0.15 or not more than 0.4, for both heavy and light samples with a specific gravity of 1.6 and 1.0 respectively as shown in FIG. 2 and Table 3, which is either the same or better than a control damping system. For example, the control damping system (with a constrained layer) having a thickness of 0.04 inches (1 mm) and specific gravity of 1.6 showed a maximum loss factor of 0.1, 0.09 and 0.05 at temperature range of 20° F., 40° F. and 60° F. at frequencies of 200 Hz, 400 Hz and 800 Hz. The sound and vibration damping system of the present disclosure having the same thickness of 0.04 inches (1 mm) and a specific gravity of about 1.0 showed a maximum loss factor of 0.261, 0.15 and 0.087 at temperature range of 20° F., 40° F. and 60° F. at frequencies of 200 Hz, 400 Hz and 800 Hz. (see loss factor values shown in Table 3). It is also notable that the sound and vibration damping systems that lack a constraining layer require significantly increased amount of mass/volume to achieve the same or equivalent loss factor achieved with the patch of the present disclosure (with a constraining layer) (see FIG. 3B).

Generally, the high performance, sound and vibration damping butyl system composed of the elastomeric layer and the constraining layer finds application in quarter panels, rooves, doors, interiors, floor pans, and the wheel houses of the motor vehicles. It may also be used in the interior of certain appliances. In other applications the sound and vibration damping system or material could be placed in a suitable position on the inside or outside of the vehicle, aircraft or structure to provide maximum performance.

In order that the invention may be more readily understood, reference is made to the following examples which are intended to illustrate the invention, but not to limit the scope thereof.

Example 1

To test the effectiveness of the damping system of the present disclosure, two sample low density butyl based compositions, namely D-216-285C (a low density composition) having a specific gravity of 0.75 and D216-285A (an ultra low-density composition) having a specific gravity of 0.92 were prepared by mixing the synthetic rubbers, one or more grades of polybutene, light weight filler along with additives such as one or more thermoplastic polymer components, plasticizers, tackifier, inorganic fillers, coloring agents, antioxidants, or combinations thereof to obtain an elastomeric layer.

Specifically, the preparation of the elastomeric layer involved mixing or blending 100 parts of one or more types of synthetic rubber (polybutene, SBR, EPDM, EPR, etc.) with 261 parts of one or more grades of polybutene, 33 parts of one or more grades of asphalt, 153 parts of rheology modifying fillers (fumed silica, precipitated silica, kaolin clay, etc.), 186 parts of light-weight fillers such as one or more grades of glass beads (qcel, 3M K series, S series, iM series, etc.), 46 parts of one or more tackifying resins, and 14 parts pigments, dispersion aides and processing aides until a visually smooth and homogenous consistency is reached. Prior to the addition of the glass bubbles as the final step in the preparation the composition, the cone penetration value was measured to ensure that the mixture was within the correct range. To make the finished sound and vibration damping system, the composition was compacted between two plates to make circular patties of 0.02 inch (light sample) or 0.04 inch (heavy sample) thickness. Subsequently the aluminum foil constraining layer was applied to the low density butyl patties with a pressurized nip roller and the finished sound and vibration damping system was allowed to cool at room temperature.

The control samples having a thickness of 0.04 inches (1 mm) were prepared by extruding the rubber layer onto a release liner followed by application of the constraining layer to produce a control patch (4189-3). The specific gravity of the control sample was 1.54.

The physical performance of the samples prepared were assessed as shown in Table 1 below. The Cold Impact and High Temperature resistance of the samples were tested by generally known OEM methods while specific ASTM methods (D1735 and B117) were used to determine the Panel adhesion characteristics.

The results of the testing for panel adhesion, cold impact and high temperature resistance at both 325° F. and 375° F. were done on the substrates including galvanized steel or galvanneal on which the damping system of the present disclosure (D215-285A and D216-285C) are applied and compared with a control (4189-3). The tests revealed that the tested samples (D215-285A and D216-285C) of lower weight or density (0.75 and 0.92 specific gravity) performed well in all the tests compared to a control with much higher density (1.54 specific gravity). So by using the light weight damping system of this disclosure it is possible to produce the same sound and vibration deadening or damping effects that one can achieve using a denser or heavier sample currently used in the industry.

TABLE 1

| SOUND DEADENER-DIE CUT-MASTIC-TACKY | | | | | |
|---|---|---|---|---|---|
| PROPERTIES | METHOD | COMPOUND REQUIREMENTS | 4189-3 RESULTS | D215-285A RESULTS | D216-285C RESULTS |
| Specific Gravity | | 1.3-2.0 | 1.54 | 0.75 | 0.92 |
| Panel Adhesion | | | | | |
| Initial | ASTM | No loss of | Pass CF | Pass CF | Pass CF |
| Humidity | D1735 | adhesion, fails | Pass CF | Pass CF | Pass CF |
| Heat Aged | | cohesively | Pass CF | Pass CF | Pass CF |
| Salt Spray | ASTM B117 | | Pass CF | Pass CF | Pass CF |
| Cycle Testing | | | Pass CF | Pass CF | Pass CF |
| Cold Impact All Substrates | | No loss of adhesion after 6 sets of slams | Pass | Pass | Pass |
| High Temp Resistance - 325° F. All Substrates | | No cracking, blistering, or loss of adhesion | Pass | Pass | Pass |
| High Temp Resistance - 375° F. All Substrates | | No cracking, blistering, or loss of adhesion | Pass | Pass | Pass |

The loss factor data of control butyl samples with constraining layer and having a specific gravity of 1.6 were compared to the sound and vibration damping systems (D215-285A and D216-285C) of the present disclosure. The results are shown in Table 2. The loss factor values suggest that the sound and vibration damping effect of the tested samples at different temperatures and frequencies were either good or better than the control samples. For example, the higher toss factor values compared to the control were observed for test numbers 1, 4, 6, and 7 shown in Table 2. In particular, the tested samples at 0.04 inch thickness (i.e., test numbers 4-8 in Table 2) showed better loss factor than the control for all temperatures and frequencies.

TABLE 2

|  | SG | Thickness (in) | Constrained layer | Cone Penetration | 90° Peel Strength | Loss Factor 20° F. | | | Loss Factor 40° F. | | | Loss Factor 70° F. | | |
| --- | --- | --- | --- | --- | --- | --- | --- | --- | --- | --- | --- | --- | --- | --- |
|  |  |  |  |  |  | 200 hz | 400 hz | 800 hz | 200 hz | 400 hz | 800 hz | 200 hz | 400 hz | 800 hz |
| Control Test No. | 1.6 | 0.04 | Yes | 90 | 14.54 | 0.061 | 0.081 | 0.121 | 0.082 | 0.092 | 0.097 | 0.052 | 0.051 | 0.041 |
| 1 | 1.04 | 0.02 | Yes | 113 | 19.62 | 0.073 | 0.096 | 0.138 | 0.091 | 0.098 | 0.095 | 0.044 | 0.039 | 0.033 |
| 2 | 1.06 | 0.02 | Yes | 77 | 7.16 | 0.056 | 0.076 | 0.113 | 0.072 | 0.098 | 0.115 | 0.066 | 0.068 | 0.059 |
| 3 | 1.62 | 0.02 | Yes | 65 | 5.94 | 0.034 | 0.072 | 0.066 | 0.038 | 0.053 | 0.077 | 0.039 | 0.048 | 0.055 |
| 4 | 1.48 | 0.02 | Yes | 110 | 16.61 | 0.077 | 0.106 | 0.146 | 0.090 | 0.107 | 0.152 | 0.063 | 0.057 | 0.047 |
| 5 | 1.62 | 0.04 | Yes | 65 | 6.37 | 0.108 | 0.154 | 0.167 | 0.121 | 0.134 | 0.135 | 0.076 | 0.061 | 0.046 |
| 6 | 1.04 | 0.04 | Yes | 113 | 22.27 | 0.143 | 0.200 | 0.261 | 0.147 | 0.145 | 0.125 | 0.069 | 0.055 | 0.042 |
| 7 | 1.48 | 0.04 | Yes | 110 | 17.32 | 0.108 | 0.154 | 0.167 | 0.121 | 0.134 | 0.135 | 0.076 | 0.061 | 0.046 |
| 8 | 1.06 | 0.04 | Yes | 77 | 5.75 | 0.088 | 0.114 | 0.151 | 0.107 | 0.145 | 0.157 | 0.082 | 0.087 | 0.079 |

The surprising results observed with the sound and vibration damping system of the present disclosure include (i) the significant weight reduction of the appliance or vehicle because of the lower weight of the patch that is as effective or even better than a control system especially with regard to the sound and vibration damping function, (ii) phase interfaces within the polymer disrupting the sound wave (solid to gas, solid to liquid, etc.), (iii) reflection of sound waves by the aluminum foil backing, and (iv) the conversion of sound waves to heat through shearing induced between the substrate and constraining layer. The key advantage of weight reduction obtained using the low density and ultra-low density patches prepared according to the present disclosure are shown in Table 3 below. The weight savings, if all constrained layer patches were switched to ultra-low density patches of the present disclosure, are about 54% (for a typical one for one patch replacement) and 83% for a ultra-light weight patch versus a LASD.

TABLE 3

Estimated Weight Savings

|  | Prior-art Butyl Patches | Ultra-light Weight Butyl Patches | Current LASD |
| --- | --- | --- | --- |
| Surface are (m$^2$) | 1.0 | 1.0 | 1.0 |
| Layer Thickness (mm) | 1.0 | 1.0 | 3.0 |
| Material (SG) | 1.6 | 0.75 | 1.4 |
| Total Volume (gal) | 0.3 | 0.3 | 0.8 |
| Total Mass (lbs) | 3.5 | 1.6 | 9.3 |

The test data suggest that the damping systems of the present disclosure are lighter than currently available OEM patches and also exhibit better sound loss performance for all temperatures and frequencies compared to a control damping system.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. As used in the specification and the claims, the singular forms "a," "an," and "the" include the plural. Finally, where the term "about" is used in conjunction with a number, it is intended to include ±10% of the number. In other words, "about 10" may mean from 1 to 20.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A vibration and sound damping system comprising:
    an elastomeric layer, and
    a metallic constraining layer,
    wherein the elastomeric layer is prepared from an uncured, low density butyl composition with a specific gravity from 0.75 to 0.9, and
    wherein the system has a damping loss factor of less than 0.4 at 20° F., 40° F. and 70° F. for frequencies of 200 Hz, 400 Hz and 800 Hz.

2. The vibration and sound damping system of claim 1, wherein the metallic constraining layer comprises aluminum.

3. The vibration and sound damping system of claim 1 further comprising a substrate layer comprising at least one from the group of wood, glass, metal, and a polymer.

4. The vibration and sound damping system of claim 1, wherein the low density butyl composition comprises:
    at least one synthetic rubber,
    at least one polybutene, and
    a plurality of light weight fillers.

5. The vibration and sound damping system of claim 4, wherein the at least one synthetic rubber is selected from the group consisting of different grades of butyl rubber, partially cross-linked butyl rubber, co-polymers of isobutylene and isoprene, and combinations thereof.

6. The vibration and sound damping system of claim 4, wherein the at least one synthetic rubber is present in amounts of about 100 parts by weight, based on 793 parts by weight of the low density butyl composition.

7. The vibration and sound damping system of claim 4, wherein the at least one polybutene is a low molecular weight polybutene present in amounts of about 261 parts by weight, based on 793 parts by weight of the density butyl composition.

8. The vibration and sound damping system of claim 4, wherein the plurality of light weight fillers are present in an amount of about 186 parts by weight, based on 793 parts by weight of the low density butyl composition.

9. The sound and vibration damping system of claim 1, wherein the low density butyl composition further comprises at least one from the group of tackifiers, molecular weight broadening agents, anti-oxidants, rheology modifying fillers, pigments, dispersion aides, and combinations thereof.

10. The vibration and sound damping system of claim 1, wherein the low density butyl composition further comprises a tackifier present in an amount of about 46 parts by weight, based on 793 parts by weight of the low density butyl composition.

11. The vibration and sound damping system of claim 1, wherein the low density butyl composition further comprises a weight broadening agent present in an amount of about 33 parts by weight, based on 793 parts by weight of the low density butyl composition.

12. The vibration and sound damping system of claim 1, wherein the low density butyl composition further comprises, in an amount of about 14 parts by weight, based on 793 parts by weight of the low density butyl composition, at least one from the group of anti-oxidants, dispersion aides, pigments, and combinations thereof.

13. The vibration and sound damping system of claim 1, wherein the low density butyl composition further comprises a rheology modifying filler selected from the group of fumed silica, precipitated silica, cellulose fibers, kaolin clay, and combinations thereof.

14. The vibration and sound damping system of claim 1, wherein the system exhibits a density less than 1.0 g/cc.

15. The vibration and sound damping system of claim 1, wherein the system exhibits a density from 0.65 to 1.0 g/cc.

* * * * *